March 26, 1957   F. A. McMILLIN   2,786,546
APPARATUS FOR LIQUID-VAPOR SEPARATION
Filed June 7, 1954

INVENTOR
FREDERICK A. McMILLIN
BY
ATTORNEYS

_United States Patent Office_

2,786,546
Patented Mar. 26, 1957

2,786,546

APPARATUS FOR LIQUID-VAPOR SEPARATION

Frederick A. McMillin, Hermosa Beach, Calif., assignor to California Research Corporation, San Francisco, Calif., a corporation of Delaware Application June 7, 1954, Serial No. 434,951

1 Claim. (Cl. 183—79)

The present invention relates to apparatus for separating the respective liquid and vapor components of a mixed liquid-vapor stream, and it finds particular utility in systems wherein said separation is to be effected with respect to a mixed liquid-vapor stream which is charged at a relatively high velocity to an evaporation zone.

In the evaporation of gases or vapors from a body of fluid by the addition of heat thereto and/or the reduction of pressure, such as in the evaporation of hydrocarbon fractions from petroleum, it is frequently desirable to be able to introduce a mixed stream of liquid and vapor. While separation can be effected to a certain extent when the mixed stream is introduced at a relatively low velocity, most refinery operations entail the use of relatively high through-put rates, with the result that the liquid-vapor stream is introduced into the evaporation zone under turbulent conditions and at high velocity. Under these conditions, not only are spray particles entrained by the vapors as soon as the stream is released within the evaporation zone, but also additional spray particles are formed as the incoming liquid impinges against the surface of any body of liquid contained in the bottom of the evaporator.

In avoidance of the foregoing difficulties, there is provided by the present invention apparatus for introducing a vapor-liquid stream into an evaporation zone so that the stream is introduced at a relatively high rate and the vapor portion separated from the stream during influx into the separating zone. In a preferred form of apparatus, the mixed liquid-vapor stream is introduced into the vessel substantially radially or normal to a wall of the vessel and then forced to flow tangentially along a surface of revolution of substantially smaller radius than the largest radius of the vessel which forms an expension chamber. Further in accordance with the invention, the expansion chamber is formed so that at least the liquid phase of the stream travels around substantially a semicircle and then flows against the wall of the vessel and through an elongated flow-straightener section which discharges the liquid horizontally and smoothly into the vessel without splashing or other mist-producing turbulence. By flowing the liquid-vapor stream through the expansion chamber, the action of centrifugal force on the two components, of different densities, permits the less-dense vapor phase to escape from the mixture and pass outwardly through the reversely-turned stream of flowing fluid, as the denser liquid phase is guided through the flow-straightener section to be directed smoothly along the inner face of the cylindrical vessel.

Further objects and advantages of the present invention will become apparent from the following detailed description taken in conjunction with the accompanying drawing, which forms an integral part of the present specification.

Figure 1:
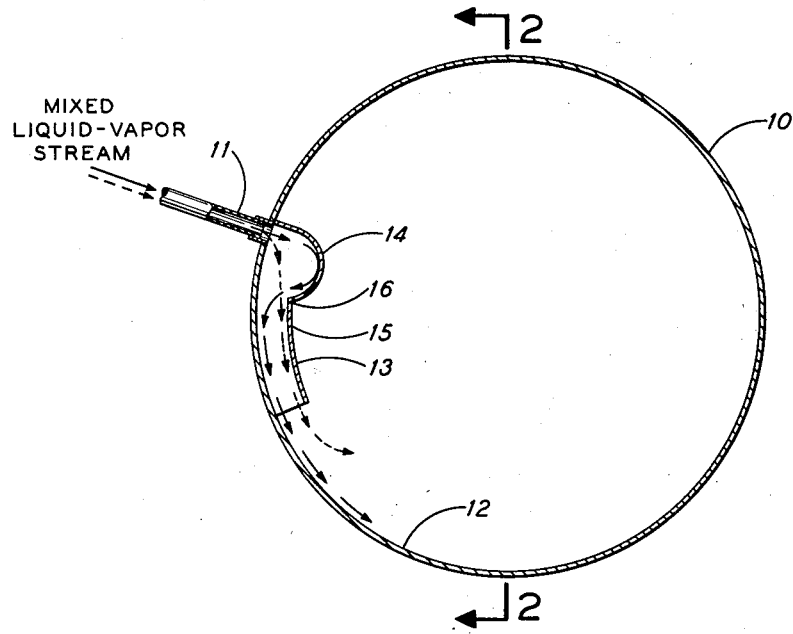
Fig. 1 is a cross-sectional, plan view of an evaporation vessel into which there has been incorporated the liquid-vapor separating nozzle constructed in accordance with the method of the present invention.

Referring now to the drawing, and in particular to Fig. 1, the invention has been illustrated as being applied to an evaporator in which the evaporation zone is defined by vessel 10, which, in the present instance, is substantially cylindrical in cross-section, although it will be understood that various other geometrical configurations may be used. As indicated by the solid line representing liquid flow and the dotted line representing vapor flow, the liquid-vapor stream is introduced into the evaporation zone through radial inlet means, pipe 11, at a relatively high input rate, so that treatment in the evaporator may be as rapid as possible under the pressure and temperature conditions obtainable therein.

Figure 2:
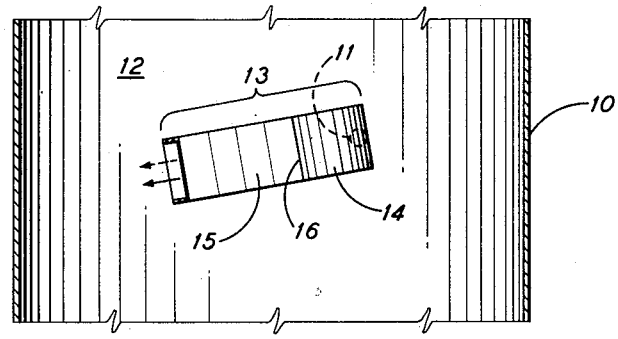
Fig. 2 is a cross-sectional elevation view in the direction of arrows 2—2 in Fig. 1.

In avoidance of the vaporous portion of the stream entraining liquid particles to form a mist, which may be carried overhead with the vapors generated in the evaporator, there is provided directional control of the flowing stream through a baffle arrangement 13 of unique character which permits a very high rate of flow therethrough with maximum release of the gas, or vapor, and minimum entrainment of liquid particles, or the formation of such particles, by permitting at least the liquid portion of the stream to follow a semicircular path along the wall of a surface of revolution, such as the semicircular path formed by wall 14. As shown, the flow so enters the chamber formed by wall 14, which, in turn, is the inlet end of the nozzle or baffle means 13, that the stream strikes the surface of revolution at a tangent to said surface. By forming the radius of the surface of revolution substantially less than the radius of the circumscribing circle within which vessel 10 lies, the liquid is forced to reverse its direction of flow back against the wall of the vessel and is made to flow, as indicated by the solid lines, along a path substantially parallel to the wall of the vessel. This flow of the liquid is confined by an elongated straightener section, identified as 15, which is adapted to intersect the surface of revolution along line 16, best seen in Fig. 2.

Further in accordance with the invention, the fluid passing out of straightener section 15 flows in a direction substantially along the inner wall or surface 12 of vessel 10. While the straightener section 15 and the nozzle 13 are shown tilted slightly downwardly in Fig. 2, it will be appreciated that the flow outward from the open end of the nozzle will be inclined slightly to the horizontal. As used hereinafter, the term "substantially horizontal" is intended to embrace a variation of not more than about 15 degrees inclination downwardly from the inlet means 11 to the center of the opening out of straightener section 15. It will be seen that with flow out of expansion nozzle arrangement 13, flow will be in a direction parallel to the wall of vessel 10 and along substantially a tangent to the circumference of the vessel.

It will be particularly noted by the vapor and liquid stream-flow lines that vapor escapes from the liquid-vapor mixture as the liquid flows into the vessel through line 11, since the less-dense vapor portion of the stream will not follow as readily the reversal of direction of flow as will the liquid. Accordingly, it is believed that the advantageous results obtained by use of the present invention with the apparatus illustrated is due at least in part to the separation of vapors from the stream, without entrainment or formation of liquid particles while the vapors are passing from expansion chamber 14 through the stream of flowing liquid, during its passage from the transition section 16 over to the wall 12. This structure permits cross-over of the vapor and liquid streams, with the vapor following the shorter path and that of least resistance, into the evaporation zone by flowing along the inner, or lesser radius, wall of straightener section 15.

From the foregoing description, it will be seen that an apparatus has been provided for introducing a liquid-vapor stream into an evaporation zone with a minimum disturbance of the evaporation process occurring from the liquid body at the bottom of the evaporation zone. By the introduction of the liquid-vapor along the prescribed flow path, there is provided a greatly improved means of vapor release which permits the vapor to escape freely within an expansion zone and then pass through a cross-over zone wherein the vapor flows back through the liquid, as the liquid is smoothly introduced into the evaporation zone under a reduced pressure head, but at a flow rate consistent with a high rate of through-put for the reaction vessel.

It will be seen that while the apparatus has been described as specifically applicable to the introduction of a liquid-vapor stream to an evaporation zone, the invention is also applicable to other treating systems using similar feed conditions.

While various modifications and changes in the single form of apparatus, illustrated and described as to its usefulness in performing the present invention, will occur to those skilled in the art from the foregoing description, all such modifications and changes which fall within the scope of the appended claim are intended to be included therein.

I claim:

Apparatus for introducing a stream of liquid-vapor mixture into a vertical cylindrical evaporation vessel and for effecting substantial separation of the components of said stream prior to their release, comprising a radial inlet to said vessel, a semicircular separation chamber having its longitudinal axis substantially parallel to that of said vessel and positioned so that said inlet is enclosed by and is tangential to the semicircular portion of said chamber, a confined flow-straightener section extending from the opposite side of said chamber from said inlet and curved to conform to the vessel wall, said section terminating in an open end outlet for separated liquid and vapor, so constructed and arranged that the separated liquid flows from said outlet to pass smoothly and circumferentially around and against the inside of said vessel.

References Cited in the file of this patent

UNITED STATES PATENTS

| | | |
|---|---|---|
| 516,371 | Gale | Mar. 13, 1894 |
| 738,745 | McCord | Sept. 8, 1903 |
| 756,537 | Simonds | Apr. 5, 1904 |
| 1,737,680 | Pinkham | Dec. 3, 1929 |
| 1,823,301 | Walker | Sept. 15, 1931 |
| 2,057,257 | Walker | Oct. 13, 1936 |
| 2,082,863 | Weisgerber | June 8, 1937 |
| 2,191,190 | De Guire | Feb. 20, 1940 |